US010025096B2

(12) United States Patent
Yoon et al.

(10) Patent No.: US 10,025,096 B2
(45) Date of Patent: Jul. 17, 2018

(54) APPARATUS AND METHOD FOR TRANSFORMING AUGMENTED REALITY INFORMATION OF HEAD-UP DISPLAY FOR VEHICLE

(71) Applicant: Electronics and Telecommunications Research Institute, Daejeon (KR)

(72) Inventors: Chang Rak Yoon, Daejeon (KR); Jungyu Kang, Daejeon (KR); Kyong Ho Kim, Daejeon (KR); Byoung Jun Park, Iksan-si (KR); Jeong Woo Lee, Daejeon (KR); Yoon Sook Hwang, Yeongcheon-si (KR)

(73) Assignee: Electronics and Telecommunications Research Institute, Daejeon (KR)

(*) Notice: Subject to any disclaimer, the term of this patent is extended or adjusted under 35 U.S.C. 154(b) by 20 days.

(21) Appl. No.: 15/413,932

(22) Filed: Jan. 24, 2017

(65) Prior Publication Data

US 2017/0307881 A1     Oct. 26, 2017

(30) Foreign Application Priority Data

Apr. 22, 2016  (KR) .................. 10-2016-0049560

(51) Int. Cl.
*G09G 5/00*    (2006.01)
*G02B 27/01*   (2006.01)
(Continued)

(52) U.S. Cl.
CPC ..... *G02B 27/0101* (2013.01); *G06K 9/00791* (2013.01); *G06K 9/4633* (2013.01);
(Continued)

(58) Field of Classification Search
CPC .............................. G06T 19/00; G06T 19/006
(Continued)

(56) References Cited

U.S. PATENT DOCUMENTS

2003/0222983 A1*  12/2003  Nobori .................... G01S 11/12
                                                        348/148
2007/0039765 A1*   2/2007  Lin .......................... B60L 3/02
                                                        180/65.1

(Continued)

FOREIGN PATENT DOCUMENTS

KR       1020150055184 A      5/2015

OTHER PUBLICATIONS

Changrak Yoon, Kyong-Ho Kim, Augmented Reality Information Registration for Head-Up Display, IEEE, Information and Communication Technology Convergence (ICTC), 2015 International Conference on, Oct. 28-30, 2015.*

(Continued)

*Primary Examiner* — Jin Ge
(74) *Attorney, Agent, or Firm* — William Park & Associates Ltd.

(57) ABSTRACT

Provided are an apparatus and method for transforming augmented reality information of a head-up display (HUD) for a vehicle. The apparatus for transforming augmented reality information of a head-up display for a vehicle includes a first projection transforming formula generation unit configured to extract a conjugate point by performing feature point matching on a first feature point of a forward recognition image of the vehicle input from a forward recognition camera and a second feature point of a first driver-based viewpoint image input from a driver-based viewpoint camera whose installation position is different from that of the forward recognition camera, and generate a first projection transforming formula; a second projection transforming formula generation unit configured to generate a second projection transforming formula using a straight-line intersection of a second driver-based viewpoint image, which is extracted from a second driver-based viewpoint image input from the driver-based viewpoint camera, and (Continued)

HUD coordinates pre-defined on the HUD; and an augmented reality information transformation unit configured to sequentially apply the generated first and second projection transforming formulas to recognition coordinates of a forward object, which is recognized from the first forward recognition image, to calculate primary and secondary transformation coordinates, and render the secondary transformation coordinates on the HUD.

20 Claims, 13 Drawing Sheets

(51) Int. Cl.
| | |
|---|---|
| G06T 19/00 | (2011.01) |
| G06K 9/00 | (2006.01) |
| G06K 9/46 | (2006.01) |
| G06T 7/73 | (2017.01) |

(52) U.S. Cl.
CPC .............. *G06T 7/73* (2017.01); *G06T 19/006* (2013.01); *G02B 2027/014* (2013.01); *G02B 2027/0138* (2013.01); *G06T 2207/20061* (2013.01); *G06T 2207/30252* (2013.01)

(58) Field of Classification Search
USPC ......................................................... 345/633
See application file for complete search history.

(56) References Cited

U.S. PATENT DOCUMENTS

| | | | |
|---|---|---|---|
| 2008/0170122 A1* | 7/2008 | Hongo | ................... G06T 7/33 348/148 |
| 2010/0220173 A1* | 9/2010 | Anguelov | .......... H04N 5/23238 348/36 |
| 2012/0224060 A1 | 9/2012 | Gurevich et al. | |
| 2012/0224062 A1* | 9/2012 | Lacoste | ................ G01C 21/365 348/148 |
| 2013/0169679 A1* | 7/2013 | Su | .......................... G02B 27/01 345/633 |
| 2013/0194110 A1 | 8/2013 | Kim et al. | |
| 2014/0211319 A1 | 7/2014 | Park et al. | |
| 2014/0362240 A1* | 12/2014 | Klivington | ......... H04N 5/23267 348/208.1 |
| 2016/0163108 A1* | 6/2016 | Kim | .................. G02B 27/0101 345/633 |
| 2017/0287108 A9* | 10/2017 | Livyatan | ............... G06T 3/0093 |

OTHER PUBLICATIONS

Lotfi Abdia, Faten Ben Abdallahb, Aref Meddebb, In-Vehicle Augmented Reality Traffic Information System: A New Type of Communication Between Driver and Vehicle, Procedia Computer Science 73 ( 2015 ) 242-249.*

Changrak Yoon et al., Augmented Reality Information Registration for Head-Up Display, International Conference on ICT Convergence 2015, Oct. 28, 2015, Republic of Korea.

* cited by examiner 601  602

701

1001

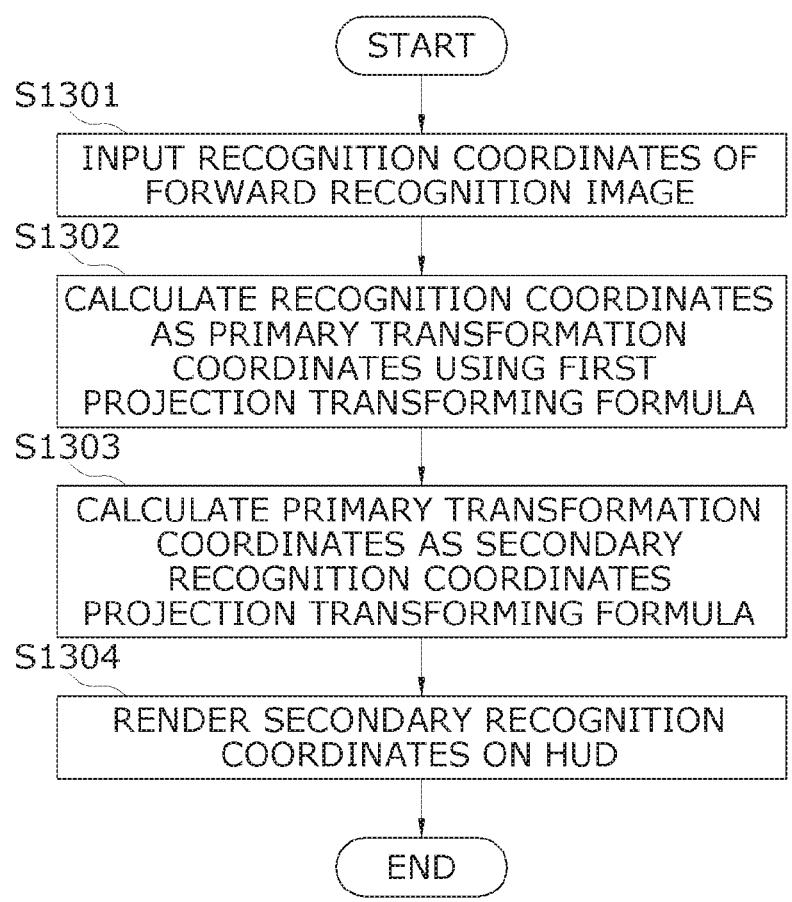

APPARATUS AND METHOD FOR TRANSFORMING AUGMENTED REALITY INFORMATION OF HEAD-UP DISPLAY FOR VEHICLE

CROSS-REFERENCE TO RELATED APPLICATION

This application claims priority to and the benefit of Korean Patent Application No. 10-2016-0049560, filed on Apr. 22, 2016, the disclosure of which is incorporated herein by reference in its entirety.

BACKGROUND

1. Field of the Invention

The present invention relates to an apparatus and method for transforming augmented reality information of a head-up display for a vehicle, and more particularly, to an apparatus and method for transforming augmented reality information of a head-up display for a vehicle which may transform recognition coordinates of an object recognized from a forward recognition camera into coordinates on a head-up display mounted in front of a driver's seat of a vehicle to express a driving situation ahead of the vehicle as augmented reality through the head-up display.

2. Discussion of Related Art

Recently, devices for the convenience of a driver have been developed with the development of functions for performance or safety of a vehicle due to the development of electronic devices, and particularly, there is an increasing interest in a head-up display (HUD) of a vehicle.

A HUD device is designed to display driving information on a windshield of a vehicle or an airplane, and it was originally introduced to secure a forward view of an airplane pilot, but has recently been introduced even in a vehicle to reduce accidents.

A HUD for a vehicle may display a variety of vehicle information such as arrow information (direction information) for guiding a route change, text information such as speed information, etc., on a windshield in conjunction with a navigation unit, thereby preventing scattering of a driver's line of sight. That is, since the driver does not have to move his or her line of sight in a direction of a terminal providing corresponding information in order to check vehicle information, and can drive the vehicle while looking ahead of an output HUD image, the driver is assisted in driving safely.

In addition, a separate display means capable of displaying the increasing number of pieces of vehicle information is required as devices for the convenience of a driver are added to a vehicle, and there is a growing interest in a HUD due to a requirement for securing a space that is required to individually install such display means.

Recently, a technology for outputting a HUD image in the form of augmented reality behind a windshield has also been developed within a HUD technology.

Augmented reality is a technique for superimposing a three-dimensional (3D) virtual image on an existing real image and outputting the superimposed image, and augmented reality applied to a HUD is implemented in such a manner that a signboard or a safe speed is superimposed on a road ahead of a corresponding vehicle.

Recently, a system for providing augmented reality information based on a HUD for a vehicle which may recognize objects such as a vehicle, a pedestrian, or a lane existing in front of a corresponding vehicle through various sensors (e.g., a camera, a radar, etc.) using a HUD mounted on a vehicle, and then display the recognized objects as graphic images at a position on the HUD coinciding with a driver's line of sight so that augmented reality information superimposed on objects in the real world may be provided.

In a system for providing augmented reality information based on a HUD for a vehicle, coordinate transformation among sensors, a driver's line of sight, and the HUD is required in order to transform object information recognized from the various sensors into a position on the HUD coinciding with the driver's line of sight.

SUMMARY OF THE INVENTION

The present invention is directed to an apparatus and method for transforming augmented reality information of a head-up display (HUD) for a vehicle which may transform coordinates of object information recognized from sensors into coordinates on the HUD in accordance with a driver's line of sight to provide augmented reality information based on the HUD for a vehicle.

The present invention is also directed to an apparatus and method for transforming augmented reality information of a HUD for a vehicle which may transform recognition coordinates of a recognized object, such as a vehicle, a pedestrian, a lane, or the like, which is recognized from a forward recognition image acquired by a forward recognition camera, which is installed at a fixed position to face ahead of a vehicle for the purpose of recognizing a vehicle, a pedestrian, or the like in front of the vehicle, into coordinates of the augmented reality information of the HUD installed in front of a driver.

According to an aspect of the present invention, there is provided an apparatus for transforming augmented reality information of a HUD for a vehicle, including: a first projection transforming formula generation unit configured to extract a conjugate point by performing feature point matching on a first feature point of a forward recognition image of the vehicle input from a forward recognition camera and a second feature point of a first driver-based viewpoint image input from a driver-based viewpoint camera whose installation position is different from that of the forward recognition camera, and generate a first projection transforming formula; a second projection transforming formula generation unit configured to generate a second projection transforming formula using a straight-line intersection of a second driver-based viewpoint image, which is extracted from a second driver-based viewpoint image input from the driver-based viewpoint camera, and HUD coordinates pre-defined on the HUD; and an augmented reality information transformation unit configured to sequentially apply the generated first and second projection transforming formulas to recognition coordinates of a forward object, which is recognized from the first forward recognition image, to calculate primary and secondary transformation coordinates, and render the secondary transformation coordinates on the HUD.

Here, the first projection transforming formula generation unit may display a result obtained by transforming coordinates of a maximum size of the forward recognition image using the generated first projection transforming formula.

Also, the first projection transforming formula generation unit may include a forward recognition image input unit configured to receive the forward recognition image of the vehicle from the forward recognition camera, a first driver-based viewpoint image input unit configured to receive the first driver-based viewpoint image from the driver-based viewpoint camera whose installation position is different from that of the forward recognition camera, a conjugate point extraction unit configured to extract the first feature point of the input forward recognition image and the second feature point of the input first driver-based viewpoint image, and extracts the conjugate point by performing feature point matching on the extracted first and second feature points, a first projection transforming formula calculation unit configured to generate the first projection transforming formula for transforming a forward recognition image into a first driver-based viewpoint image using the extracted conjugate point as a factor of a method of least squares, and a first projection transforming formula storage unit configured to store the generated first projection transforming formula.

Also, the conjugate point extraction unit may determine whether the number of the extracted feature points is equal to or larger than a minimum number of feature points, and extract the conjugate point by performing feature point matching on the extracted first and second feature points when the number of the extracted feature points is equal to or larger than the minimum number of feature points.

Also, the first projection transforming formula calculation unit may calculate a projection error using a root mean square error (RMSE) of the conjugate point transformed by the generated first projection transforming formula, remove a conjugate point that causes an excessive error among conjugate points when the calculated projection error exceeds a predetermined allowable error range, and then recalculate the first projection transforming formula.

Also, the conjugate point extraction unit may apply a filter using only a feature point located on a ground to the extracted first and second feature points, and extract the conjugate point by performing feature point matching on the feature point to which the filter is applied.

Also, the second projection transforming formula generation unit may include a HUD coordinate input unit configured to receive the pre-defined HUD coordinates, a second driver-based viewpoint image input unit configured to receive the second driver-based viewpoint image from the driver-based viewpoint camera, a straight-line intersection extraction unit configured to extract a plurality of straight-lines from the input second driver-based viewpoint image with respect to the input HUD coordinates, and extract a straight-line intersection of the second driver-based viewpoint image from the extracted plurality of straight-lines, and a second projection transforming formula calculation unit configured to generate the second projection transforming formula for transforming a driver-based viewpoint image into HUD coordinates using the extracted straight-line intersection of the second driver-based viewpoint image and the input HUD coordinates.

Also, the straight-line intersection extraction unit may extract the plurality of straight-lines from the input second driver-based viewpoint image using Hough transform.

Also, the second projection transforming formula calculation unit may set the pre-defined HUD coordinates and the extracted straight-line intersection of the second driver-based viewpoint image as matching conjugate points, and generate the second projection transforming formula using a homography transformation formula.

Also, the augmented reality information transformation unit may include a forward object recognition unit configured to receive the recognition coordinates of the forward object recognized from the first forward recognition image, a projection transformation unit configured to calculate the input recognition coordinates as primary transformation coordinates using the generated first projection transforming formula, and calculates the calculated primary transformation coordinates as secondary recognition coordinates using the generated second projection transforming formula, and an augmented reality display unit renders the calculated secondary recognition coordinates on the HUD.

According to another aspect of the present invention, there is provided a method for transforming augmented reality information of a HUD for a vehicle, including: generating a first projection transforming formula by extracting a conjugate point by performing feature point matching on a first feature point of a forward recognition image of the vehicle input from a forward recognition camera and a second feature point of a first driver-based viewpoint image input from a driver-based viewpoint camera whose installation position is different from that of the forward recognition camera; generating a second projection transforming formula using a straight-line intersection of a second driver-based viewpoint image, which is extracted from a second driver-based viewpoint image input from the driver-based viewpoint camera, and HUD coordinates pre-defined on the HUD; and sequentially applying the generated first and second projection transforming formulas to recognition coordinates of a forward object recognized from the first forward recognition image to calculate primary and secondary transformation coordinates, and rendering the secondary transformation coordinates on the HUD.

Here, the method for transforming augmented reality information of a HUD for a vehicle may further include displaying a result obtained by transforming coordinates of a maximum size of the forward recognition image using the generated first projection transforming formula.

Also, the generating of the first projection transforming formula may include receiving the forward recognition image of the vehicle from the forward recognition camera, receiving the first driver-based viewpoint image from the driver-based viewpoint camera whose installation position is different from that of the forward recognition camera, extracting the first feature point of the input forward recognition image, extracting the second feature point of the input first driver-based viewpoint image, extracting the conjugate point by performing feature point matching on the extracted first and second feature points, and generating the first projection transforming formula for transforming a forward recognition image into a first driver-based viewpoint image using the extracted conjugate point as a factor of a method of least squares.

Also, the method for transforming augmented reality information of a HUD for a vehicle may further include determining whether the number of the extracted feature points is equal to or larger than a minimum number of feature points, wherein the extracting of the conjugate point includes extracting the conjugate point by performing feature point matching on the extracted first and second feature points when the number of the extracted feature points is equal to or larger than the minimum number of feature points.

Also, the method for transforming augmented reality information of a HUD for a vehicle may further include calculating a projection error using an RMSE of the conjugate point transformed by the generated first projection transforming formula after the generating of the first projection transforming formula; and removing a conjugate point that causes an excessive error among conjugate points when the calculated projection error exceeds a predetermined allowable error range, and then recalculating the first projection transforming formula.

Also, the method for transforming augmented reality information of a HUD for a vehicle may further include applying a filter using only a feature point located on a ground to the extracted first and second feature points, wherein the extracting of the conjugate point includes extracting the conjugate point by performing feature point matching on the feature points to which the filter is applied.

Also, the generating of the second projection transforming formula may include receiving the HUD coordinates pre-defined on the HUD, receiving the second driver-based viewpoint image from the driver-based viewpoint camera, extracting a plurality of straight-lines from the input second driver-based viewpoint image with respect to the input HUD coordinates, extracting a straight-line intersection of the second driver-based viewpoint image from the extracted plurality of straight-lines, and generating the second projection transforming formula for transforming a driver-based viewpoint image into HUD coordinates using the extracted straight-line intersection of the second driver-based viewpoint image and the input HUD coordinates.

Also, the extracting of the plurality of straight-lines may include extracting the plurality of straight-lines from the input second driver-based viewpoint image using Hough transform.

Also, the generating of the second projection transforming formula may include setting the pre-defined HUD coordinates and the extracted straight-line intersection of the second driver-based viewpoint image as matching conjugate points, and generating the second projection transforming formula using a homography transformation formula.

Also, the sequentially applying of the generated first and second projection transforming formulas may include receiving the recognition coordinates of the forward object recognized from the first forward recognition image, calculating the input recognition coordinates as primary transformation coordinates using the generated first projection transforming formula, calculating the calculated primary transformation coordinates as secondary recognition coordinates using the generated second projection transforming formula, and rendering the calculated secondary recognition coordinates on the HUD.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 13 is a flowchart illustrating a process of transforming augmented reality information in a method for transforming augmented reality information of a HUD for a vehicle according to an embodiment of the present invention.

DETAILED DESCRIPTION OF EXEMPLARY EMBODIMENTS

Figure 1:
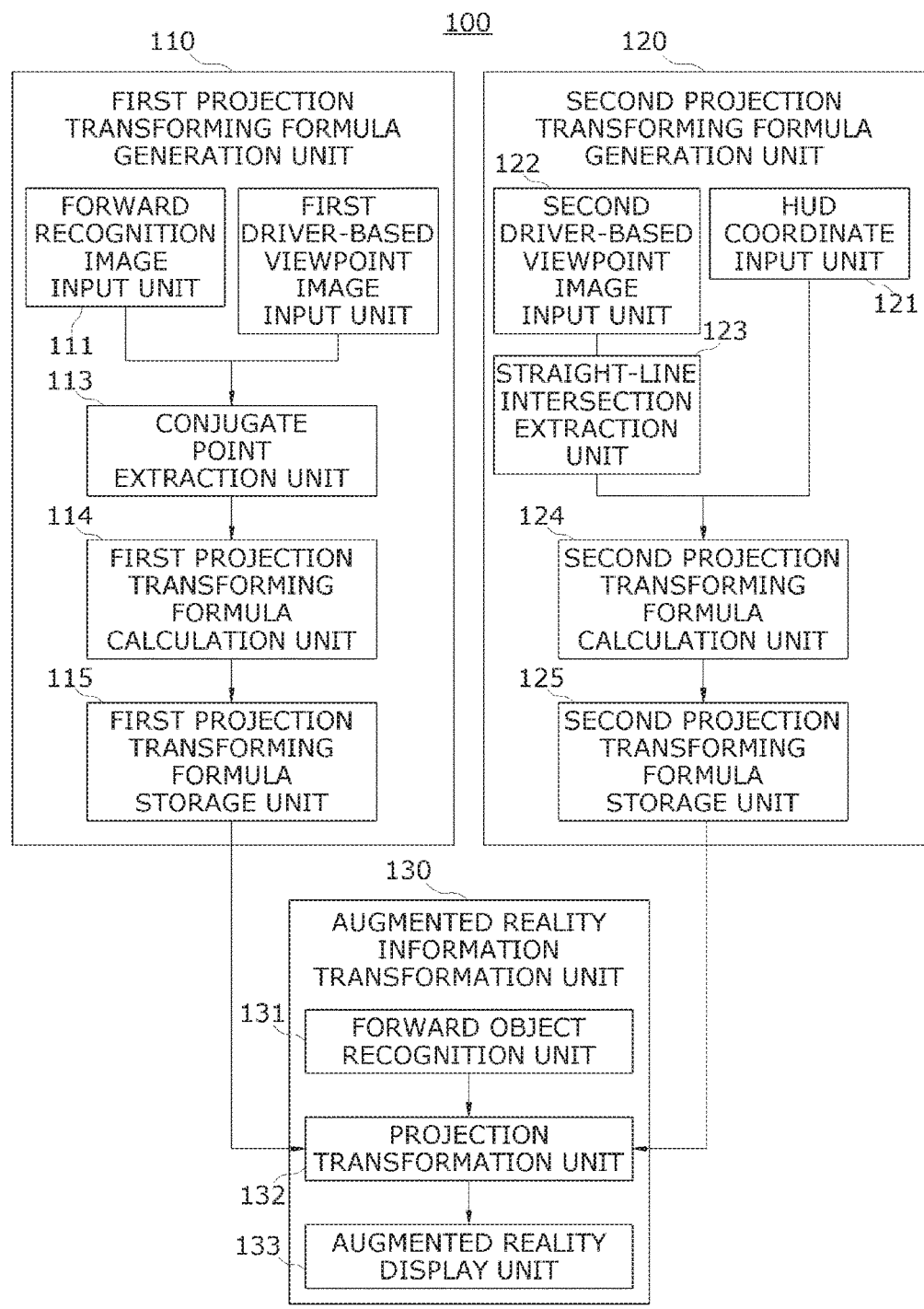
FIG. 1 is a configuration diagram illustrating an apparatus for transforming augmented reality information of a head-up display (HUD) for a vehicle according to an embodiment of the present invention.

Hereinafter, embodiments of the present invention that are easily performed by those skilled in the art will be described in detail with reference to the accompanying drawings. In detailed descriptions of operation principles of the exemplary embodiments of the present invention, when it is determined that detailed descriptions of related well-known functions and configurations unnecessarily obscure the gist of the invention, detailed descriptions thereof will be omitted. This serves to convey the principles of the invention more clearly by omitting unnecessary descriptions. In descriptions of components of the present invention, a different reference numeral may be assigned to the same component depending on the drawings, and the same reference numeral may be assigned to the same component in different drawings. However, neither of these means either that the component has a different function depending on embodiments or that the component has the same function in different embodiments. Functions of each component may be determined based on descriptions of each component in the embodiment.

Hereinafter, preferred embodiments of an apparatus and method for transforming augmented reality information of a head-up display (HUD) for a vehicle according to the present invention will be described in detail with reference to the accompanying drawings.

FIG. 1 is a configuration diagram illustrating an apparatus for transforming augmented reality information of a HUD for a vehicle according to an embodiment of the present invention.

As illustrated in FIG. 1, an apparatus 100 for transforming augmented reality information of a HUD for a vehicle according to an embodiment of the present invention may include a first projection transforming formula generation unit 110, a second projection transforming formula generation unit 120, and an augmented reality information transformation unit 130.

The first projection transforming formula generation unit 110 generates a first projection transforming formula for transforming a first forward recognition image into a first driver-based viewpoint image. Here, the first forward recognition image is an image obtained from a forward recognition camera installed at a fixed position that faces ahead of a corresponding vehicle for the purpose of recognizing a vehicle, a pedestrian, etc., in front of the vehicle. In addition, the first driver-based viewpoint image is an image obtained from a driver-based viewpoint camera installed at a reference position of a driver's seat headrest from which a driver may check graphics of the HUD.

In general, since an installation position of the forward recognition camera and an installation position of the driver-based viewpoint camera are different, the first forward recognition image and the first driver-based viewpoint image have different visual field ranges even when they are photographed in the same direction. Accordingly, the first projection transforming formula generation unit 110 transforms coordinates of the first forward recognition image for a specific object into coordinates corresponding to the same object in the first driver-based viewpoint image.

To this end, the first projection transforming formula generation unit 110 extracts a conjugate point through feature point matching with respect to a feature point of the forward recognition image of the vehicle input from the forward recognition camera and a feature point of the first driver-based viewpoint image input from the driver-based viewpoint camera whose installation position is different from that of the forward recognition camera, and thereby generates the first projection transforming formula.

The first projection transforming formula generation unit 110 displays a result obtained by transforming coordinates of a maximum size of the forward recognition image using the generated first projection transforming formula.

The first projection transforming formula generation unit 110 may include a forward recognition image input unit 111, a first driver-based viewpoint image input unit 112, a conjugate point extraction unit 113, a first projection transforming formula calculation unit 114, and a first projection transforming formula storage unit 115, as illustrated in FIG. 1.

The forward recognition image input unit 111 receives the forward recognition image of the vehicle from the forward recognition camera.

The first driver-based viewpoint image input unit 112 receives the first driver-based viewpoint image from the driver-based viewpoint camera whose installation position is different from that of the forward recognition camera.

The conjugate point extraction unit 113 extracts a first feature point of the forward recognition image input from the forward recognition image input unit 111 and a second feature point of the first driver-based viewpoint image input from the first driver-based viewpoint image input unit 112, and extracts a conjugate point by performing feature point matching on the extracted first and second feature points. That is, the conjugate point extraction unit 113 extracts a feature point of each of the first forward recognition image and the first driver-based viewpoint image, and extracts the conjugate point from which the first projection transforming formula may be calculated by performing feature point matching on the extracted feature points. Here, the conjugate point extraction unit 113 may determine whether the number of the extracted feature points is equal to or larger than a minimum number of feature points, and extract the conjugate point by performing feature point matching on the first and second feature points when the number of the extracted feature points is equal to or larger than the minimum number of feature points.

Here, the conjugate point extraction unit 113 may apply a filter which uses only a feature point located on the ground to the extracted first and second feature points, and perform feature point matching on the feature points to which the filter is applied to extract the conjugate point.

The first projection transforming formula calculation unit 114 generates the first projection transforming formula for transforming a forward recognition image into a first driver-based viewpoint image using the conjugate point extracted from the conjugate point extraction unit 113 as a factor of a method of least squares. That is, the first projection transforming formula calculation unit 114 generates a coordinate transformation formula for transforming a first forward recognition image into a first driver-based viewpoint image by calculating the first projection transforming formula using the extracted conjugate point as a factor.

The first projection transforming formula calculation unit 114 calculates a projection error using a root mean square error (RMSE) of the conjugate point transformed by the generated first projection transforming formula.

The first projection transforming formula calculation unit 114 may remove a conjugate point that causes an excessive error among conjugate points when the calculated projection error exceeds a predetermined allowable error range, and may then recalculate the first projection transforming formula.

The first projection transforming formula storage unit 115 may store the first projection transforming formula generated by the first projection transforming formula calculation unit 114.

Meanwhile, the second projection transforming formula generation unit 120 is used for generating a second projection transforming formula for transforming a second driver-based viewpoint image into HUD coordinates. Here, the HUD coordinates indicate a maximum resolution of a device that generates graphics at a specific distance in front of a driver-based viewpoint for the purpose of displaying vehicle information, driving information, recognition information, etc. In addition, the second driver-based viewpoint image is an image obtained by displaying a plurality of straight-lines on the HUD based on the HUD coordinates.

The second projection transforming formula generation unit 120 extracts intersections of straight-lines displayed according to pre-defined HUD coordinates and the HUD coordinates of the second driver-based viewpoint image, and uses the extracted intersections as conjugate points. The second projection transforming formula generation unit 120 generates a coordinate transformation formula for transforming a second driver-based viewpoint image into HUD coordinates by calculating the second projection transforming formula using the extracted conjugate point as a factor.

To this end, the second projection transforming formula generation unit 120 generates the second projection transforming formula using the straight-line intersections of the second driver-based viewpoint image extracted from the second driver-based viewpoint image input from the driver-based viewpoint camera and the HUD coordinates pre-defined on the HUD.

Meanwhile, the second projection transforming formula generation unit 120 shown in FIG. 1 may include a HUD coordinate input unit 121, a second driver-based viewpoint image input unit 122, a straight-line intersection extraction unit 123, a second projection transforming formula calculation unit 124, and a second projection transforming formula storage unit 125.

The HUD coordinate input unit 121 receives pre-defined HUD coordinates.

The second driver-based viewpoint image input unit 122 receives the second driver-based viewpoint image from the driver-based viewpoint camera.

The straight-line intersection extraction unit 123 extracts a plurality of straight-lines from the second driver-based viewpoint image input by the second driver-based viewpoint image input unit 122 with respect to the HUD coordinates input by the HUD coordinate input unit 121, and extracts straight-line intersections of the second driver-based viewpoint image from the extracted plurality of straight-lines.

Here, the straight-line intersection extraction unit 123 may extract the plurality of straight-lines from the second driver-based viewpoint image input from the second driver-based viewpoint image input unit 122 using Hough transform.

The second projection transforming formula calculation unit 124 may generate the second projection transforming formula for transforming a second driver-based viewpoint image into HUD coordinates using the straight-line intersection of the second driver-based viewpoint image extracted from the straight-line intersection extraction unit 123 and the HUD coordinates input by the HUD coordinate input unit 121. Here, the second projection transforming formula calculation unit 124 may set the pre-defined HUD coordinates and the extracted straight-line intersection of the second driver-based viewpoint image as matching conjugate points and generate the second projection transforming formula using a homography transformation formula.

Meanwhile, a process of the first projection transforming formula generation unit 110 generating the first projection transforming formula for transforming a first forward recognition image into a first driver-based viewpoint image and a process of the second projection transforming formula generation unit 120 generating the second projection transforming formula for transforming a second driver-based viewpoint image into HUD coordinates may be executed before real-time operation of the vehicle so that each of the projection transforming formulas may be generated.

In order to express a coordinate value of a forward object recognized from the first forward recognition image acquired in real-time on the HUD matched with an object of the real world viewed by a driver, the augmented reality information transformation unit 130 may express the coordinate value of the forward object as augmented reality by sequentially applying the first projection transforming formula for transforming a first forward recognition image into a first driver-based viewpoint image and the second projection transforming formula for transforming a second driver-based viewpoint image into HUD coordinates to the coordinate value of the forward object.

To this end, the augmented reality information transformation unit 130 may sequentially apply the first and second projection transforming formulas respectively generated by the first projection transforming formula generation unit 110 and the second projection transforming formula generation unit 120 to recognition coordinates of the forward object recognized from the first forward recognition image to calculate primary and secondary transformation coordinates, and render the secondary transformation coordinates on the HUD.

The augmented reality information transformation unit 130 shown in FIG. 1 may include a forward object recognition unit 131, a projection transformation unit 132, and an augmented reality display unit 133.

The forward object recognition unit 131 receives recognition coordinates of a forward object recognized from a first forward recognition image.

The projection transformation unit 132 calculates the recognition coordinates input by the forward object recognition unit 131 as primary transformation coordinates using the first projection transforming formula generated by the first projection transforming formula generation unit 110.

Next, the projection transformation unit 132 may calculate the calculated primary transformation coordinates as secondary recognition coordinates using the second projection transforming formula generated by the second projection transforming formula generation unit 120.

The augmented reality display unit 133 may render the secondary recognition coordinates calculated by the projection transformation unit 132 on the HUD.

Figure 2:
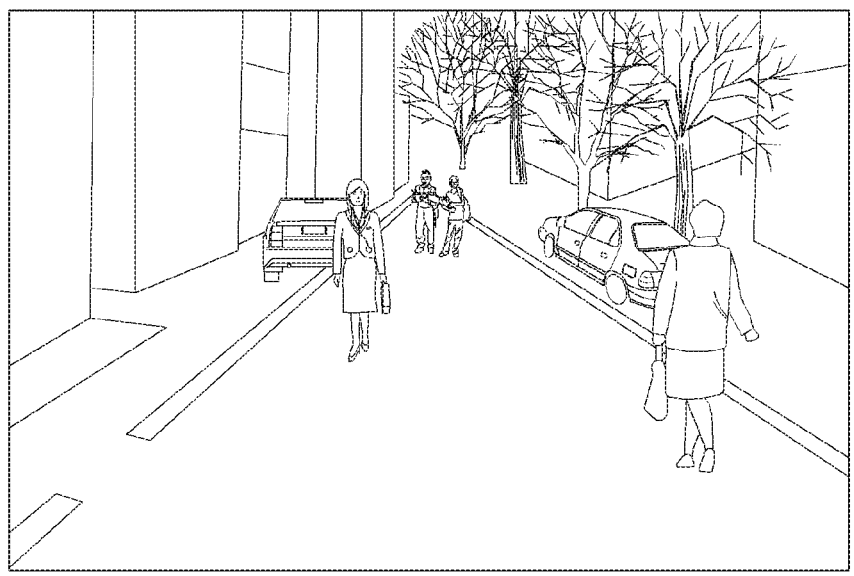
FIG. 2 is an exemplary diagram illustrating a first forward recognition image acquired from a forward recognition camera according to an embodiment of the present invention.
Figure 3:
FIG. 3 is an exemplary diagram illustrating a first driver-based viewpoint image acquired from a driver-based viewpoint camera according to an embodiment of the present invention.

FIG. 2 is an exemplary diagram illustrating a first forward recognition image acquired from a forward recognition camera according to an embodiment of the present invention, and FIG. 3 is an exemplary diagram illustrating a first driver-based viewpoint image acquired from a driver-based viewpoint camera according to an embodiment of the present invention.

Referring to a comparison between FIGS. 2 and 3, the first forward recognition image and the first driver-based viewpoint image have different visual field ranges even when they are photographed in the same direction. As described above, these different visual field ranges are caused by a difference in installation position between the forward recognition camera and the driver-based viewpoint camera.

Figure 4:
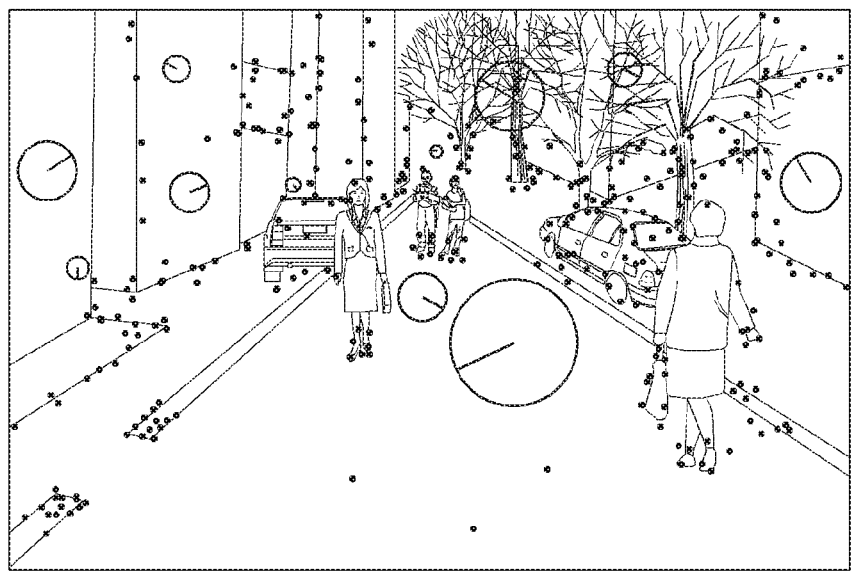
FIG. 4 is an exemplary diagram illustrating a first feature point extracted from a first forward recognition image according to an embodiment of the present invention.
Figure 5:
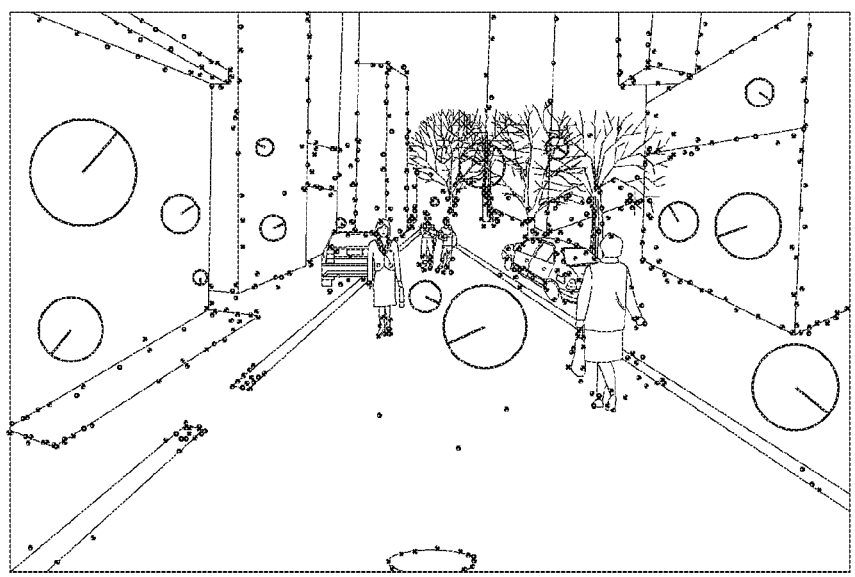
FIG. 5 is an exemplary diagram illustrating a second feature point extracted from a first driver-based viewpoint image according to an embodiment of the present invention.
Figure 6:
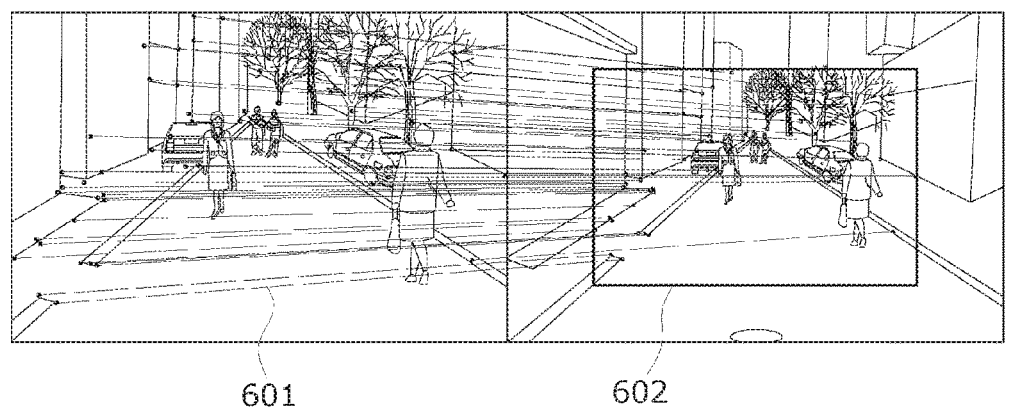
FIG. 6 is an exemplary diagram illustrating a coordinate transformation result reflecting a result obtained by calculating a first projection transforming formula according to an embodiment of the present invention.

FIG. 4 is an exemplary diagram illustrating a first feature point extracted from a first forward recognition image according to an embodiment of the present invention, FIG. 5 is an exemplary diagram illustrating a second feature point extracted from a first driver-based viewpoint image according to an embodiment of the present invention, and FIG. 6 is an exemplary diagram illustrating a coordinate transformation result reflecting a result obtained by calculating a first projection transforming formula according to an embodiment of the present invention.

As illustrated in FIG. 6, the first projection transforming formula generation unit 110 extracts a conjugate point by matching a first feature point of a first forward recognition image and a second feature point of a first driver-based viewpoint image, and provides a coordinate transformation result that reflects a result obtained by calculating a first projection transforming formula using the extracted conjugate point as a factor of a method of least squares.

The left image in FIG. 6 is the first forward recognition image, and the right image in FIG. 6 is the first driver-based viewpoint image.

In FIG. 6, straight-lines 601 connecting points of each image indicate conjugate points, and a rectangle 602 indicates a result obtained by transforming coordinates of a maximum size of the first forward recognition image using the first projection transforming formula generated using the conjugate points. At this point, the first projection transforming formula generation unit 110 may apply a filter using only a feature point located on the ground when extracting feature points of each image, thereby improving the reliability of the first projection transforming formula.

Figure 7:
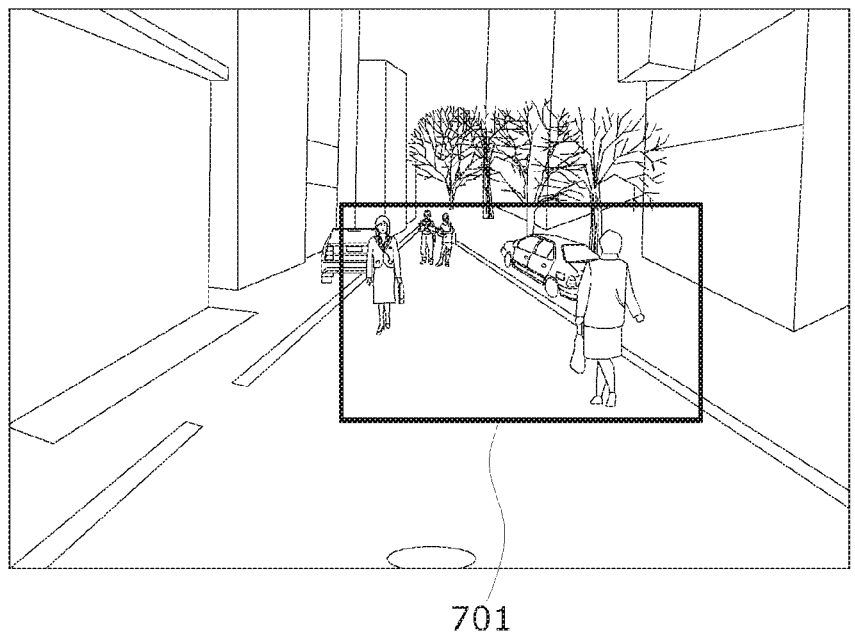
FIG. 7 is an exemplary diagram illustrating a second driver-based viewpoint image acquired after displaying a plurality of straight-lines on a HUD according to an embodiment of the present invention.

FIG. 7 is an exemplary diagram illustrating a second driver-based viewpoint image acquired after displaying a plurality of straight-lines on a HUD according to an embodiment of the present invention. That is, FIG. 7 shows the second driver-based viewpoint image acquired after displaying the plurality of straight-lines on the HUD with respect to HUD coordinates.

In FIG. 7, a rectangle indicates a result obtained by displaying a plurality of straight-lines 701 on the HUD with respect to the HUD coordinates.

Figure 8:
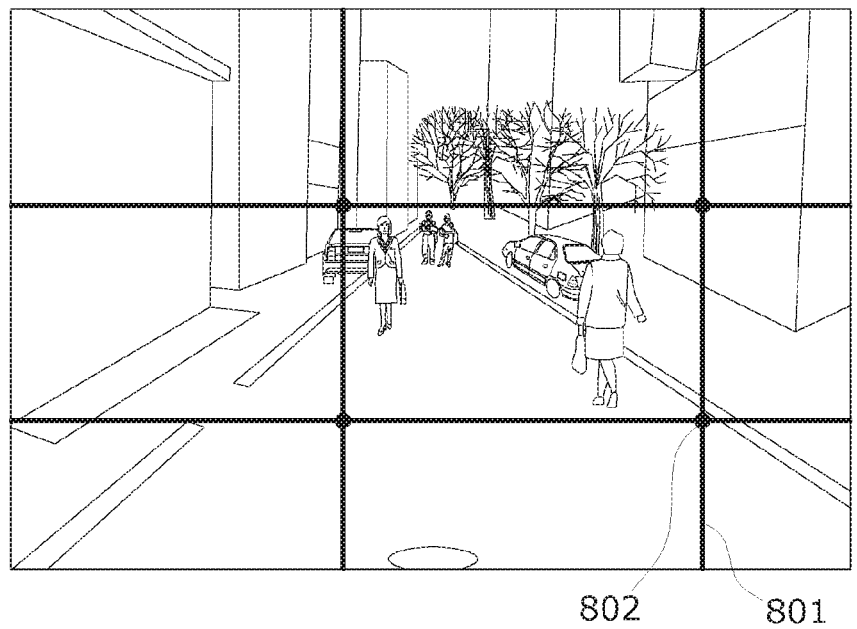
FIG. 8 is an exemplary diagram illustrating straight-lines and intersections extracted from a second driver-based viewpoint image according to an embodiment of the present invention.

FIG. 8 is an exemplary diagram illustrating straight-lines 801 and intersections 802 extracted from a second driver-based viewpoint image according to an embodiment of the present invention.

In FIG. 8, straight-lines indicate the straight-lines 801 extracted from the second driver-based viewpoint image, and circles indicate the intersections 802 calculated from the extracted straight-lines. The second projection transforming formula generation unit 120 combines the intersections 802 of the straight-lines and pre-defined HUD coordinates, and uses the combined intersections as conjugate points. The second projection transforming formula generation unit 120 may perform a preprocessing operation such as an operation of processing the second driver-based viewpoint image with a threshold value. This is to improve the reliability of straight-line extraction when extracting straight-line intersections.

Figure 9:
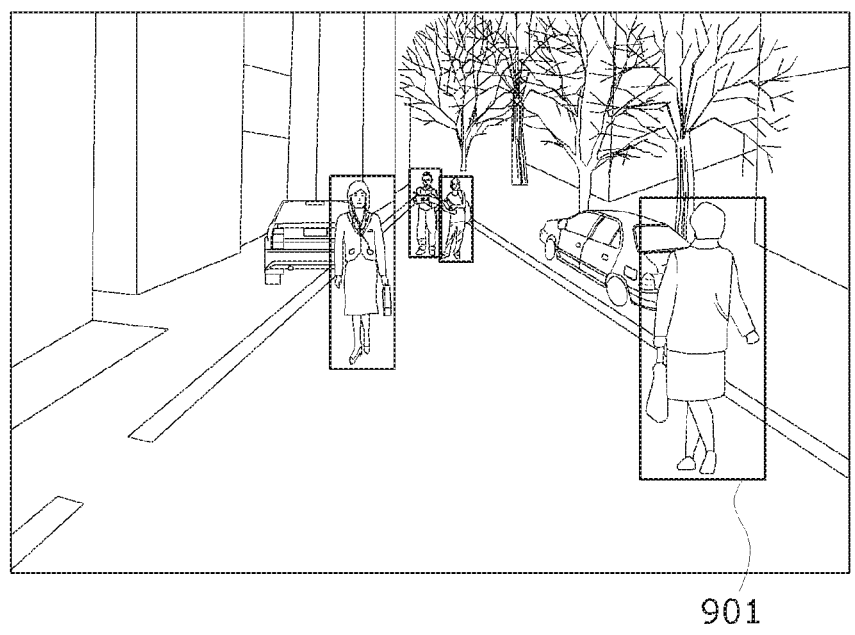
FIG. 9 is an exemplary diagram illustrating forward objects recognized in real-time from a first forward recognition image according to an embodiment of the present invention.

FIG. 9 is an exemplary diagram illustrating forward objects (for example, pedestrians) recognized in real-time from a first forward recognition image according to an embodiment of the present invention.

In FIG. 9, vertices 901 of rectangles indicate recognition coordinates of the forward objects (for example, pedestrians) recognized in real-time from the first forward recognition image.

Figure 10:
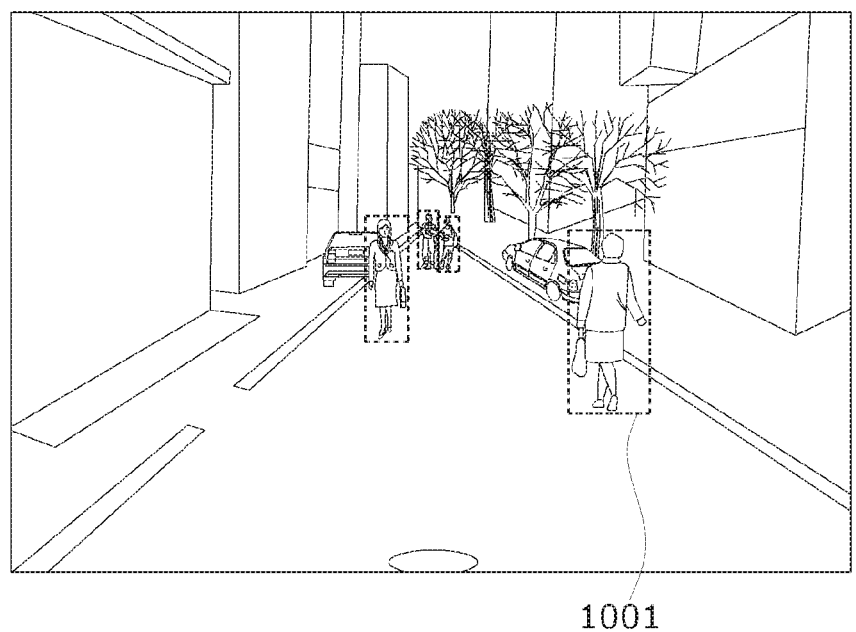
FIG. 10 is an exemplary diagram illustrating a result obtained by sequentially applying first and second projection transforming formulas to recognition coordinates of a forward object according to an embodiment of the present invention.

FIG. 10 is an exemplary diagram illustrating a result obtained by sequentially applying first and second projection transforming formulas to recognition coordinates of a forward object according to an embodiment of the present invention. That is, FIG. 10 shows a result obtained by sequentially applying the first projection transforming formula for transforming a first forward recognition image into a first driver-based viewpoint image and the second projection transforming formula for transforming a second driver-based viewpoint image into HUD coordinates to the recognition coordinates of the forward object recognized from the first forward recognition image.

FIG. 10 is a result showing that the recognition coordinates of the forward object are displayed on the HUD by sequentially applying the projection transforming formulas thereto, and then the displayed recognition coordinates are photographed using the driver-based viewpoint camera so that the photographed coordinates are expressed as augmented reality. In FIG. 10, vertices 1001 of rectangles are results showing that the recognition coordinates of the forward objects (for example, pedestrians) recognized in real-time from the first forward recognition image are displayed on the HUD by sequentially applying the first projection transforming formula for transforming a first forward recognition image into a first driver-based viewpoint image and the second projection transforming formula for transforming a second driver-based viewpoint image into HUD coordinates to the recognition coordinates of the forward objects.

As illustrated in FIGS. 9 and 10, it can be seen that the coordinates of the forward objects (for example, pedestrians) recognized from the first forward recognition image are transformed into the HUD coordinates, and the HUD coordinates overlap with the real world when viewed from a driver's viewpoint so that they can be expressed as augmented reality.

Figure 11:
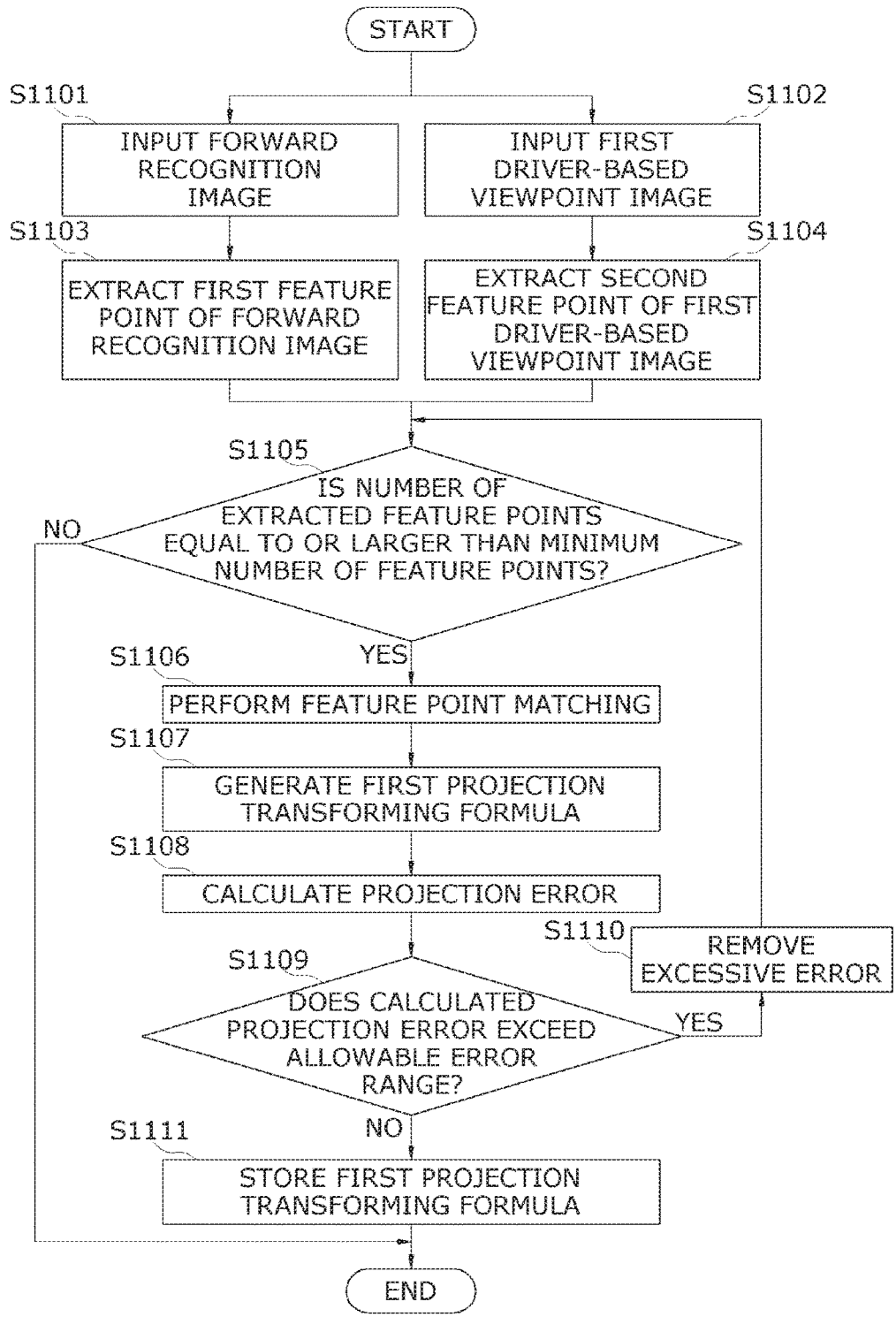
FIG. 11 is a flowchart illustrating a process of generating a first projection transforming formula for transforming a first forward recognition image into a first driver-based viewpoint image in a method for transforming augmented reality information of a HUD for a vehicle according to an embodiment of the present invention.

FIG. 11 is a flowchart illustrating a process of generating a first projection transforming formula for transforming a first forward recognition image into a first driver-based viewpoint image in a method for transforming augmented reality information of a HUD for a vehicle according to an embodiment of the present invention.

As illustrated in FIG. 11, in operation S1101, the first projection transforming formula generation unit 110 receives a forward recognition image of a vehicle from a forward recognition camera.

In addition, in operation S1102, the first projection transforming formula generation unit 110 receives a first driver-based viewpoint image from a driver-based viewpoint camera whose installation position is different from the installation position of the forward recognition camera.

Next, in operation S1103, the first projection transforming formula generation unit 110 extracts a first feature point of the input forward recognition image. In addition, in operation S1104, the first projection transforming formula generation unit 110 extracts a second feature point of the input first driver-based viewpoint image. Here, the first projection transforming formula generation unit 110 may extract the first and second feature points of the first forward recognition image and the first driver-based viewpoint image using a method such as corner point extraction.

In operation S1105, the first projection transforming formula generation unit 110 determines whether the number of the extracted feature points is equal to or larger than a minimum number of feature points. Here, the minimum number of feature points is determined according to a degree of freedom of the first projection transforming formula. For example, when at least five conjugate points are required, the minimum number of feature points of at least 4 times or more the number of required conjugate points may be set.

In operation S1106, when the number of the extracted feature points is equal to or larger than the minimum number of feature points based on the determination result of operation S1105, the first projection transforming formula generation unit 110 extracts a conjugate point by performing feature point matching on the first and second feature points. That is, the first projection transforming formula generation unit 110 may match feature point extraction results in the two images.

On the other hand, when the number of the extracted feature points is less than the minimum number of feature points based on the determination result of operation S1105, the first projection transforming formula generation unit 110 terminates a process of generating the first projection transforming formula.

Next, in operation S1107, the first projection transforming formula generation unit 110 generates the first projection transforming formula for transforming the forward recognition image into the first driver-based viewpoint image using the extracted conjugate point as a factor of a method of least squares. The first projection transforming formula generation unit 110 may calculate the first projection transforming formula using a homography transformation formula using the conjugate point or the like.

Next, in operation S1108, the first projection transforming formula generation unit 110 calculates a projection error using an RMSE of the conjugate point transformed by the generated first projection transforming formula.

Next, in operation S1109, the first projection transforming formula generation unit 110 determines whether the calculated projection error exceeds a predetermined allowable error range.

In operation S1110, when the calculated projection error exceeds the predetermined allowable error range based on the determination result of operation S1109, the first projection transforming formula generation unit 110 removes a conjugate point that causes an excessive error among the conjugate points.

After removing the conjugate point, the first projection transforming formula generation unit 110 performs the corresponding process again starting from operation S1105 of determining the minimum number of feature points. That is, when the calculated projection error exceeds the predetermined allowable error range, the first projection transforming formula generation unit 110 removes the conjugate point that causes the excessive error among the conjugate points and then recalculates the first projection transforming formula.

On the other hand, in operation S1111, when the calculated projection error does not exceed the predetermined allowable error range based on the determination result of operation S1109, the first projection transforming formula generation unit 110 stores the generated first projection transforming formula.

Figure 12:
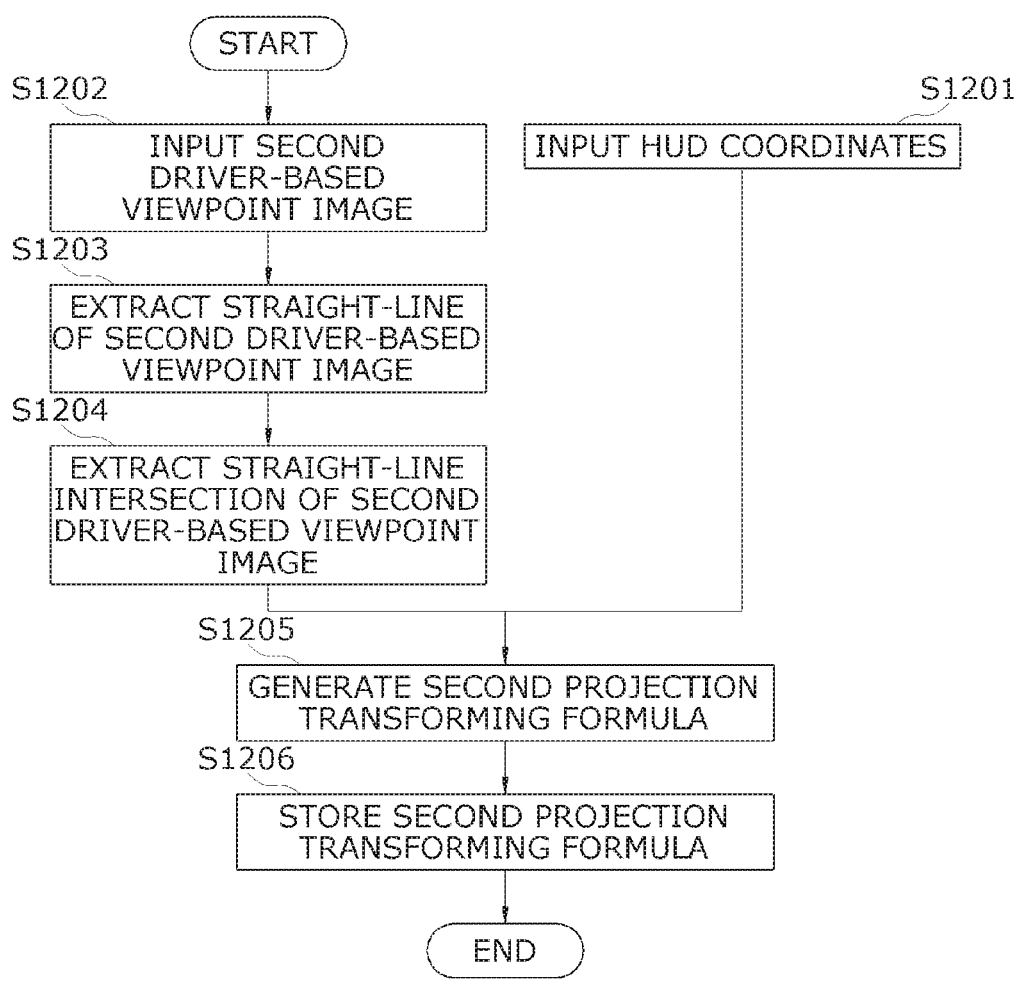
FIG. 12 is a flowchart illustrating a process of generating a second projection transforming formula for transforming a second driver-based viewpoint image into HUD coordinates in a method for transforming augmented reality information of a HUD for a vehicle according to an embodiment of the present invention.

FIG. 12 is a flowchart illustrating a process of generating a second projection transforming formula for transforming a second driver-based viewpoint image into HUD coordinates in a method for transforming augmented reality information of a HUD for a vehicle according to an embodiment of the present invention.

As illustrated in FIG. 12, in operation S1201, the second projection transforming formula generation unit 120 receives HUD coordinates pre-defined on a HUD.

In addition, in operation S1202, the second projection transforming formula generation unit 120 receives a second driver-based viewpoint image from a driver-based viewpoint camera.

Next, in operation S1203, the second projection transforming formula generation unit 120 extracts a plurality of straight-lines from the second driver-based viewpoint image with respect to the input HUD coordinates.

Next, the second projection transforming formula generation unit 120 extracts straight-line intersections of the second driver-based viewpoint image from the extracted plurality of straight-lines. Here, in operation S1204, the straight-line intersection extraction unit 123 may extract the plurality of straight-lines from the input second driver-based viewpoint image using Hough transform.

In operation S1205, the second projection transforming formula generation unit 120 generates a second projection transforming formula for transforming a driver-based viewpoint image into HUD coordinates using the extracted straight-line intersection of the second driver-based viewpoint image and the HUD coordinates.

In operation S1206, the second projection transforming formula generation unit 120 stores the generated second projection transforming formula for transforming a driver-based viewpoint image into HUD coordinates. Here, the second projection transforming formula calculation unit 124 may set pre-defined HUD coordinates and an extracted straight-line intersection of the second driver-based viewpoint image as matching conjugate points and generate the second projection transforming formula using a homography transformation formula.

FIG. 13 is a flowchart illustrating a process of transforming augmented reality information in a method for transforming augmented reality information of a HUD for a vehicle according to an embodiment of the present invention.

As illustrated in FIG. 13, in operation S1301, the augmented reality information transformation unit 130 receives recognition coordinates of a forward object recognized from a first forward recognition image. Here, the recognition coordinates in the first forward recognition image represent recognition coordinates of various recognized objects such as a recognized vehicle, a recognized pedestrian, a recognized lane, and the like according to the purpose.

In operation S1302, the augmented reality information transformation unit 130 calculates the input recognition coordinates as primary transformation coordinates using the first projection transforming formula generated by the first projection transforming formula generation unit 110. That is, the recognition coordinates of the recognized object are primarily calculated as the primary transformation coordinates using the first projection transforming formula for transforming a first forward recognition image into a first driver-based viewpoint image.

Next, in operation S1303, the augmented reality information transformation unit 130 calculates the calculated primary transformation coordinates as secondary recognition coordinates using the second projection transforming formula generated by the second projection transforming formula generation unit 120. That is, the primary transformation coordinates are calculated as the secondary transformation coordinates using the second projection transforming formula for transforming a second driver-based viewpoint image into HUD coordinates.

In operation S1304, the augmented reality information transformation unit 130 renders the calculated secondary recognition coordinates on the HUD. That is, the secondary transformation coordinates are rendered on the HUD according to the corresponding coordinates. Then, a corresponding driver may confirm augmented reality information matched with the real world.

As described above, an apparatus and method for transforming augmented reality information of a HUD for a vehicle according to the present invention may transform recognition coordinates of a recognized object such as a vehicle, a pedestrian, or the like which is recognized from a forward recognition image acquired by a forward recognition camera installed at a fixed position to face ahead of the vehicle for the purpose of recognizing a vehicle, a pedestrian, or the like in front of the vehicle, into coordinates of augmented reality information of a HUD installed in front of a driver.

In addition, an apparatus and method for transforming augmented reality information of a HUD for a vehicle according to the present invention may enable virtual graphic information to be superimposed on an actual vehicle, a pedestrian, a lane, etc., in front of a driver when the driver looks forward through the HUD.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for transforming augmented reality information of a head-up display (HUD) for a vehicle, comprising:
   a first projection transforming formula generation unit configured to extract a conjugate point by performing feature point matching on a first feature point of a forward recognition image of the vehicle input from a forward recognition camera and a second feature point of a first driver-based viewpoint image input from a driver-based viewpoint camera whose installation position is different from that of the forward recognition camera, and generate a first projection transforming formula by extracting the conjugate point;
   a second projection transforming formula generation unit configured to generate a second projection transforming formula using a straight-line intersection of a second driver-based viewpoint image, which is extracted from the second driver-based viewpoint image input from the driver-based viewpoint camera, and HUD coordinates pre-defined on the HID; and
   an augmented reality information transformation unit configured to sequentially apply the generated first and second projection transforming formulas to recognition coordinates of a forward object, which is recognized from the first forward recognition image, to calculate primary and secondary transformation coordinates, and render the secondary transformation coordinates on the HUD.

2. The apparatus for transforming augmented reality information of a HUD for a vehicle of claim 1, wherein the first projection transforming formula generation unit displays a result obtained by transforming coordinates of a maximum size of the forward recognition image using the generated first projection transforming formula.

3. The apparatus for transforming augmented reality information of a HUD for a vehicle of claim 1, wherein the first projection transforming formula generation unit includes:
   a forward recognition image input unit configured to receive the forward recognition image of the vehicle from the forward recognition camera,
   a first driver-based viewpoint image input unit configured to receive the first driver-based viewpoint image from the driver-based viewpoint camera whose installation position is different from that of the forward recognition camera,
   a conjugate point extraction unit configured to extract the first feature point of the input forward recognition image and the second feature point of the input first driver-based viewpoint image, and extract the conjugate point by performing feature point matching on the extracted first and second feature points,
   a first projection transforming formula calculation unit configured to generate the first projection transforming formula for transforming a forward recognition image into a first driver-based viewpoint image using the extracted conjugate point as a factor of a method of least squares, and
   a first projection transforming formula storage unit configured to store the generated first projection transforming formula.

4. The apparatus for transforming augmented reality information of a HUD for a vehicle of claim 3, wherein the conjugate point extraction unit determines whether the number of the extracted feature points is equal to or larger than a minimum number of feature points, and extracts the conjugate point by performing feature point matching on the extracted first and second feature points when the number of the extracted feature points is equal to or larger than the minimum number of feature points.

5. The apparatus for transforming augmented reality information of a HUD for a vehicle of claim 3, wherein the first projection transforming formula calculation unit calculates a projection error using a root mean square error (RMSE) of the conjugate point transformed by the generated first projection transforming formula, removes a conjugate point that causes an excessive error among conjugate points when the calculated projection error exceeds a predetermined allowable error range, and then recalculates the first projection transforming formula.

6. The apparatus for transforming augmented reality information of a HUD for a vehicle of claim 3, wherein the conjugate point extraction unit applies a filter using only a feature point located on a ground to the extracted first and second feature points, and extracts the conjugate point by performing feature point matching on the feature point to which the filter is applied.

7. The apparatus for transforming augmented reality information of a HUD for a vehicle of claim 1, wherein the second projection transforming formula generation unit includes:
   a HUD coordinate input unit configured to receive the pre-defined HUD coordinates,
   a second driver-based viewpoint image input unit configured to receive the second driver-based viewpoint image from the driver-based viewpoint camera,
   a straight-line intersection extraction unit configured to extract a plurality of straight-lines from the input second driver-based viewpoint image with respect to the input HUD coordinates, and extract a straight-line intersection of the second driver-based viewpoint image from the extracted plurality of straight-lines, and
   a second projection transforming formula calculation unit configured to generate the second projection transforming formula for transforming a driver-based viewpoint image into HUD coordinates using the extracted straight-line intersection of the second driver-based viewpoint image and the input HUD coordinates.

8. The apparatus for transforming augmented reality information of a HUD for a vehicle of claim 7, wherein the straight-line intersection extraction unit extracts the plurality of straight-lines from the input second driver-based viewpoint image using Hough transform.

9. The apparatus for transforming augmented reality information of a HUD for a vehicle of claim 7, wherein the second projection transforming formula calculation unit sets the pre-defined HUD coordinates and the extracted straight-line intersection of the second driver-based viewpoint image as matching conjugate points, and generates the second projection transforming formula using a homography transformation formula.

10. The apparatus for transforming augmented reality information of a HUD for a vehicle of claim 1, wherein the augmented reality information transformation unit includes:
    a forward object recognition unit configured to receive the recognition coordinates of the forward object recognized from the first forward recognition image,
    a projection transformation unit configured to calculate the input recognition coordinates as primary transformation coordinates using the generated first projection transforming formula, and calculates the calculated primary transformation coordinates as secondary recognition coordinates using the generated second projection transforming formula, and an augmented reality display unit renders the calculated secondary recognition coordinates on the HUD.

11. A method for transforming augmented reality information of a HUD for a vehicle, comprising:

generating a first projection transforming formula by extracting a conjugate point by performing feature point matching on a first feature point of a forward recognition image of the vehicle input from a forward recognition camera and a second feature point of a first driver-based viewpoint image input from a driver-based viewpoint camera whose installation position is different from that of the forward recognition camera;

generating a second projection transforming formula using a straight-line intersection of a second driver-based viewpoint image, which is extracted from a second driver-based viewpoint image input from the driver-based viewpoint camera, and HUD coordinates pre-defined on the HUD; and sequentially applying the generated first and second projection transforming formulas to recognition coordinates of a forward object recognized from the first forward recognition image to calculate primary and secondary transformation coordinates, and rendering the secondary transformation coordinates on the HUD.

12. The method for transforming augmented reality information of a HUD for a vehicle of claim 11, further comprising:

displaying a result obtained by transforming coordinates of a maximum size of the forward recognition image using the generated first projection transforming formula.

13. The method for transforming augmented reality information of a HUD for a vehicle of claim 11, wherein the generating of the first projection transforming formula includes:

receiving the forward recognition image of the vehicle from the forward recognition camera, receiving the first driver-based viewpoint image from the driver-based viewpoint camera whose installation position is different from that of the forward recognition camera, extracting the first feature point of the input forward recognition image, extracting the second feature point of the input first driver-based viewpoint image, extracting the conjugate point by performing feature point matching on the extracted first and second feature points, and generating a first projection transforming formula for transforming a forward recognition image into a first driver-based viewpoint image using the extracted conjugate point as a factor of a method of least squares.

14. The method for transforming augmented reality information of a HUD for a vehicle of claim 13, further comprising:

determining whether the number of the extracted feature points is equal to or larger than a minimum number of feature points, wherein the extracting of the conjugate point includes extracting the conjugate point by performing feature point matching on the extracted first and second feature points when the number of the extracted feature points is equal to or larger than the minimum number of feature points.

15. The method for transforming augmented reality information of a HUD for a vehicle of claim 13, further comprising:

calculating a projection error using an RMSE of the conjugate point transformed by the generated first projection transforming formula after the generating of the first projection transforming formula; and removing a conjugate point that causes an excessive error among conjugate points when the calculated projection error exceeds a predetermined allowable error range, and then recalculating the first projection transforming formula.

16. The method for transforming augmented reality information of a HUD for a vehicle of claim 13, further comprising:

applying a filter using only a feature point located on a ground to the extracted first and second feature points, wherein the extracting of the conjugate point includes extracting the conjugate point by performing feature point matching on the feature points to which the filter is applied.

17. The method for transforming augmented reality information of a HUD for a vehicle of claim 11, wherein the generating of the second projection transforming formula includes:

receiving the HUD coordinates pre-defined on the HUD, receiving the second driver-based viewpoint image from the driver-based viewpoint camera, extracting a plurality of straight-lines from the input second driver-based viewpoint image with respect to the input HUD coordinates, extracting a straight-line intersection of the second driver-based viewpoint image from the extracted plurality of straight-lines, and generating the second projection transforming formula for transforming a driver-based viewpoint image into HUD coordinates using the extracted straight-line intersection of the second driver-based viewpoint image and the input HUD coordinates.

18. The method for transforming augmented reality information of a HUD for a vehicle of claim 17, wherein the extracting of the plurality of straight-lines includes extracting the plurality of straight-lines from the input second driver-based viewpoint image using Hough transform.

19. The method for transforming augmented reality information of a HUD for a vehicle of claim 17, wherein the generating of the second projection transforming formula includes setting the pre-defined HUD coordinates and the extracted straight-line intersection of the second driver-based viewpoint image as matching conjugate points, and generating the second projection transforming formula using a homography transformation formula.

20. The method for transforming augmented reality information of a HUD for a vehicle of claim 11, wherein the sequentially applying of the generated first and second projection transforming formulas includes:

receiving the recognition coordinates of the forward object recognized from the first forward recognition image, calculating the input recognition coordinates as primary transformation coordinates using the generated first projection transforming formula, calculating the calculated primary transformation coordinates as secondary recognition coordinates using the generated second projection transforming formula, and
rendering the calculated secondary recognition coordinates on the HUD.

\* \* \* \* \*